United States Patent Office 2,914,556
Patented Nov. 24, 1959

2,914,556

PREPARATION OF LACTONE ADDUCTS

Fritz Hostettler, Charleston, and Leland C. Shriver, South Charleston, W. Va., assignors to Union Carbide Corporation, a corporation of New York No Drawing. Application April 13, 1956
Serial No. 577,953

15 Claims. (Cl. 260—484)

This invention relates to an improved process for forming lactone adducts and polyesters that are useful as plasticizers and as intermediates in the preparation of polyurethane resins, foams and coating compositions.

We have made the surprising discovery that various lactones can readily be reacted in the presence of an inorganic acidic catalyst with an organic compound having at least one hydroxyl or amino radical, such a compound being referred to herein as a mono- or polyfunctional initiator, to form adducts that include esters, i.e., mono- and polyesters, amides, i.e., mono- and polyamides, as well as amide esters and amide polyesters.

The primary advantages of the method of the invention are that the rate of reaction and polymerization of a lactone with an initiator is greatly accelerated and that such reaction and polymerization can be carried out effectively at significantly lower temperatures than heretofore considered commercially practicable. Furthermore, esters and polyesters formed with the aid of inorganic acid catalysts are suitable for use in the formation of polyurethane elastomers and foams without requiring neutralization of the catalysts.

The acidic materials suitable as catalysts in the method of the invention include hydrogen chloride, sulfuric acid, phosphoric acid, zinc chloride, aluminum trichloride, tin dichloride, tin tetrachloride, and boron trifluoride.

The optimum temperature and time of reaction are related to one another as well as to the particular acidic material used as catalyst, the concentration thereof, and to the lactone used as reactant. Generally, the temperature of reaction may be as low as about 20–25° C. and as high as about 180° C. Temperatures above about 150° C. are unnecessary because the rate of reaction is satisfactory at lower temperatures and should be avoided with the stronger catalysts, e.g., sulfuric acid and boron trifluoride, in order to minimize dehydration of the adduct. At temperatures below about 50° C., the time required increases appreciably unless the concentration of catalyst is significantly increased. The generally preferred range of temperature is therefore from about 50° C. to about 150° C. and the optimum lies between about 60° C. and 120° C. The catalyst concentration may vary from an extremely low amount of the order of about 0.001% by weight based on the weight of lactone, to as high as about 0.5%. Higher concentrations require careful neutralization of the adduct before it can be reacted with a diisocyanate. The preferred range of concentration is between about 0.01% and 0.1%, the optimum being at about 0.05%. It will be understood by those skilled in the art that generally lower catalyst concentrations will suffice with the more active catalysts such as $H_2SO_4$ and $BF_3$ and that somewhat higher concentrations are in order with the less active catalysts such as phosphoric acid. With HCl the concentration used may be as high as about 2.5%.

The lactone used as a starting material may be any lactone, or combination of lactones, having six or more carbon atoms in the ring. Lactones having five or less carbon atoms in the ring are considered unsuitable for the purposes of the invention because of the tendency that polymers thereof have to revert to the monomer at elevated temperature. One or more of the carbon atoms in the lactone ring may be substituted by alkyl, cycloalkyl, alkoxy or aromatic radicals containing up to about twelve carbon atoms. The lactones preferred as starting materials in the method of the invention are those having the general formula:

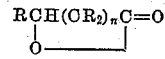

wherein $n$ is at least four, at least $n+2$ R's are hydrogen, the remainder of the R's are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Lactones having greater numbers of substituents other than hydrogen on the ring are considered unsuitable for the purposes of the invention because of the tendency that polymers thereof have to revert to the monomer, particularly at elevated temperature. Unsubstituted epsilon-caprolactone, in which $n$ is four and all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes.

Among the substituted epsilon-caprolactones considered most suitable as starting materials in the method of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones. Mixtures of substituted lactones and mixtures of substituted lactones with unsubstituted lactones have been found to be particularly desirable in the preparation of plasticizers and polyurethane resin intermediates.

Epsilon-caprolactones having substituents other than hydrogen on the epsilon carbon atom can be reacted but are not preferred if it is desired to use one of the stronger inorganic acidic materials as catalyst and to obtain a polyester having predominantly hydroxyl terminal groups. The reason for this is that apparently the secondary hydroxyls formed at the ends of the polyester chains when epsilon-substituted epsilon-caprolactones are used are more readily dehydrated by the acidic material to form unsaturations:

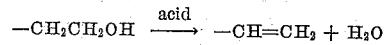

As shown hereinafter, however, epsilon-substituted epsilon-caprolactones are operable as starting materials, particularly but not only when the weaker acidic catalysts are used, for the preparation of hydroxyl-terminated polyesters and are as suitable as any other lactone in forming a polyester when the terminal structure thereof is immaterial.

Lactones having more than six carbon atoms in the ring, e.g., zeta-enantholactone and eta-caprylolactone, may also be reacted with an initiator in accordance with the method of this invention.

The initiators that are preferred in the method of the invention are represented by the general formula $$R'(YH)_y$$

in which R' is an organic radical selected from the group consisting of aliphatic, cycloaliphatic, aromatic and heterocyclic radicals, y is a number equal to the functionality of the initiator, and the Y's stand for —O—, —NH— and —NR"—, R" being alkyl, aryl, aralkyl or cycloalkyl. These include monofunctional initiators such as alcohols and amines, that have a reactive site capable of opening the lactone ring and adding it onto the initiator as an open chain without forming water of condensation, and polyfunctional initiators such as polyols, polyamines, amino alcohols, and vinyl polymers, as well as amides, sulfonamides, hydrazones, semicarbazones and oximes having two or more such reactive sites.

Alcohols that are useful as monofunctional initiators include primary, secondary, and tertiary aliphatic alcohols such as methanol, ethanol, propanol, isopropanol, 1-butanol, 2-butanol, tert.-butanol, 1-pentanol, 3-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-hepanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Amines that are useful as monofunctional initiators include primary and secondary aliphatic amines such as methyl, ethyl, n-propyl, isopropyl, n-butyl, sec.-butyl, isobutyl, tert.-butyl, n-amyl, n-hexyl and 2-ethylhexylamine, as well as the corresponding dialkyl amines; aromatic amines such as aniline, ortho-toluidine, meta-toluidine, para-toluidine, and diphenylamine; cycloaliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which n equals 2 to 10, glycols of the formulae $HO(CH_2CH_2O)_nH$ and $HO(CHCH_3CH_2O)_nH$ in which n equals 1 to 40, 2,2-dimethyl-1,3-propanediol, 2,2-diethyl-1,3-propanediol, 3-methyl-1,5-pentanediol, N-methyl- and N-ethyl-diethanolamines, various cyclohexanediols,

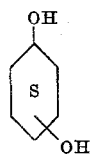

4,4'-methylenebiscyclohexanol,

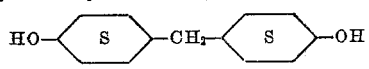

4,4'-isopropylidenebiscyclohexanol,

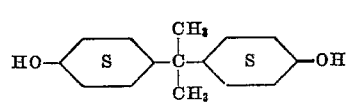

various xylenediols,

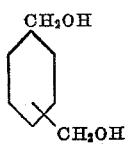

various hydroxymethyl-phenethyl alcohols,

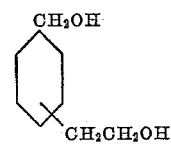

various hydroxymethyl-phenylpropanols,

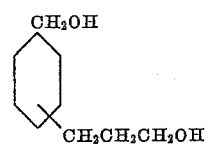

various phenylenediethanols,

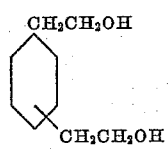

various phenylenedipropanols,

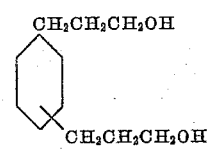

and various heterocyclic diols such as 1,4-piperazine diethanol,

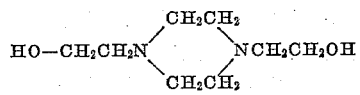

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamido, or carboxyl groups. They are obtainable by reacting diols of the class $HO(CH_2)_nOH$, where n equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives is illustrated by the reaction of 1,4-butanediol with ethylene oxide:

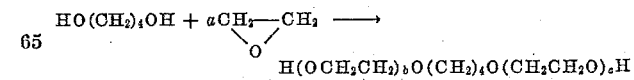

where $a=b+c=1$ to 40.

Further useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of inorganic and organic acids; and inorganic acids or anhydrides thereof whose anions show little tendency to polarize. Polymers containing hydroxyl end-groups may be obtained by treating these products with alkaline reagents upon completion of the polymerization reaction. Among suitable monoepoxides for preparing such polymers are tetrahydrofuran, trimethylene oxide, propylene oxide, ethylene oxide, or mixtures thereof.

Higher functional alcohols suitable for initiating the polymerization of lactones include triols such as glycerol, trimethylolpropane, 1,2,4-butanetriol, 1,2,6-hexanetriol, N-triethanolamine, and N-triisopropanolamine; various tetrols like erythritol, penetaerythritol, N,N,N',N'-tetrakis(2-hydroxyethyl)ethylenediamine, $$\begin{array}{c} HOCH_2CH_2 \\ HOCH_2CH_2 \end{array} NCH_2CH_2N \begin{array}{c} CH_2CH_2OH \\ CH_2CH_2OH \end{array}$$

and N,N,N',N' - tetrakis(2 - hydroxypropyl)ethylenediamine;

$$\begin{array}{c} CH_3 \\ HOCHCH_2 \\ HOCHCH_2 \\ CH_3 \end{array} NCH_2CH_2N \begin{array}{c} CH_3 \\ CH_2CHOH \\ CH_2CHOH \\ CH_3 \end{array}$$

pentols, hexols, like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

$$CH_3CH_2-\underset{\underset{CH_2OH}{|}}{\overset{\overset{CH_2OH}{|}}{C}}-CH_2OH + a CH_2-CH_2 = CH_3CH_2-\underset{\underset{CH_2O(CH_2CH_2O)_dH}{|}}{\overset{\overset{CH_2O(CH_2CH_2O)_bH}{|}}{C}}-CH_2O(CH_2CH_2O)_cH$$

where $a=b+c+d=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, glucose, sucrose, diamines of the general formula $H_2N(CH_2)_nNH_2$, where $n$ equals 2 to 10, 2-(methylamino)ethylamine, various phenylene- and toluene-diamines, benzidine, 3,3' - dimethyl - 4,4' - biphenyldiamine, 4,4'-methylenedianiline, 4,4',4''-methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid, $$HOOC-CH=\underset{\underset{COOH}{|}}{C}-CH_2-COOH$$

mellitic acid,

[benzene ring with COOH, COOH, HOOC, COOH, HOOC, COOH]

and pyromellitic acid,

[benzene ring with COOH, COOH, HOOC, COOH]

and polyfunctional inorganic acids like phosphoric acid.

Difunctional amino alcohols capable of initiating the polymerization of lactones include aliphatic amino alcohols of the general formula $HO(CH_2)_nNH_2$, where $n$ equals 2 to 10, N-methylethanolamine $$HOCH_2CH_2\overset{\overset{CH_3}{|}}{N}H$$

isopropanolamine, $$HO\overset{\overset{CH_3}{|}}{C}HCH_2NH$$

N-methylisopropanolamine, $$HO\overset{\overset{CH_3}{|}}{C}HCH_2\overset{\overset{CH_3}{|}}{N}H$$

aromatic amino alcohols like para-amino-phenethyl alcohol,

[benzene ring with CH₂CH₂OH and NH₂]

and para-amino-alpha-methylbenzyl alcohol,

[benzene ring with CHOHCH₃ and NH₂]

and various cycloaliphatic amino alcohols like 4-aminocyclohexanol.

[cyclohexane ring with OH and NH₂, marked S]

Higher functional amino alcohols having a total of at least three hydroxy and primary or secondary amino groups that are suitable include diethanolamine, diisopropanolamine, 2-(2-aminoethylamino)ethanol, $$H_2NCH_2CH_2-NH-CH_2CH_2OH$$

2-amino-2(hydroxymethyl)-1,3-propanediol, $$HOCH_2-\underset{\underset{CH_2OH}{|}}{\overset{\overset{NH_2}{|}}{C}}-CH_2OH$$

and 2-amino-2-methyl-1,3-propanediol.

$$HOCH_2-\underset{\underset{CH_3}{|}}{\overset{\overset{NH_2}{|}}{C}}-CH_2OH$$

Suitable diamines include aliphatic diamines of the general formula $H_2N(CH_2)_nNH_2$, monosecondary diamines of the general formula $R''NH(CH_2)_nNH_2$, and disecondary diamines of the general formula $R''NH-(CH_2)_nNHR''$, where $n$ equals 2 to 10 and where $R''$ is alkyl, aryl, aralkyl or cycloalkyl; aromatic diamines, like metaphenylenediamine, para-phenylenediamine, toluene-2,4-diamine, toluene-2,6-diamine, 1,5-naphthalenediamine, 1,8 - naphthalenediamine, meta - xylylenediamine, para-xylylenediamine, benzidine, 3,3'-dimethyl-4,4'-biphenyldiamine, 3,3'-dimethoxy - 4,4' - biphenyldiamine, 3,3'-dichloro - 4,4' - biphenyldiamine, 4,4' - methylenedianiline, 4,4' - ethylenedianiline, 2,3,5,6 - tetramethyl-para-phenylenediamine, 2,5 - fluorenediamine, and 2,7 - fluorenediamine; and cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminopropyl)piperazine.

Higher functional polyamines typical of those suitable for use in the method are: diethylenetriamine, triethylenetetramine, tetraethylenepentamine, diisopropylenetriamine, triisopropylenetetramine, tetraisopropylenepentamine, 1,2,5 - benzenetriamine, toluene - 2,4,6 - triamine, 4,4′,4″-methylidynetrianiline,

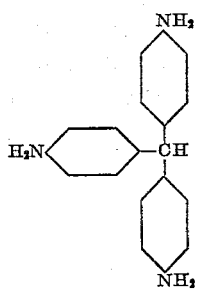

and polyamines obtained by interaction of aromatic monoamines with formaldehyde or other aldehydes, for example:

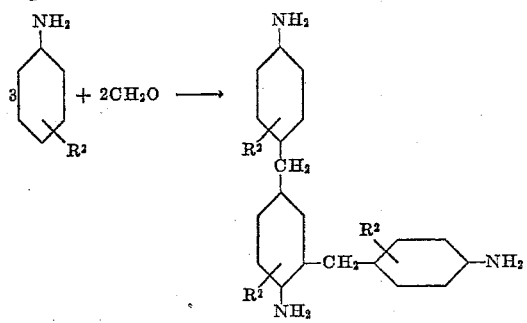

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

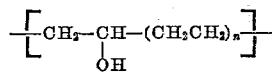

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene,

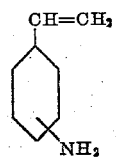

3-butene-1,2-diol $CH_2=CH-CHOH-CH_2OH$, allyl alcohol, methallyl alcohol, 3-phenyl-3-butene-1-ol,

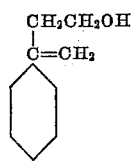

and vinyl ethers like diethylene glycol monovinyl ether $CH_2=CH-OCH_2CH_2OCH_2CH_2OH$.

A monofunctional initiator is believed to open the lactone ring to produce an adduct having one terminal hydroxyl group that is capable of opening further lactone rings and thereby of adding more and more lactone to the molecule. Thus, for example, the polymerization of epsilon-caprolactone initiated with methanol is believed to proceed primarily as follows:

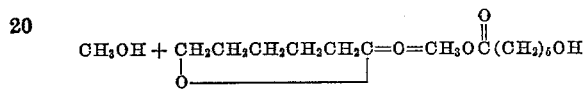

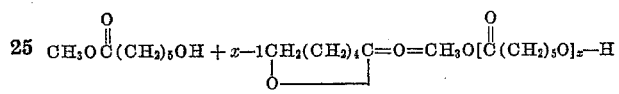

A side reaction that apparently also takes place and accounts for some terminal carboxyl groups on the final product involves ring cleavage, in the case of epsilon-caprolactone, of the lactone ring between the oxy group and the epsilon carbon rather than the carbonyl carbon. Thus, for example, the reaction of epsilon-caprolactone with methanol may also proceed, to a minor extent, as follows:

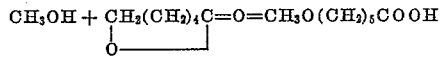

which, if an excess of lactone is available, will proceed to add on further lactone residues:

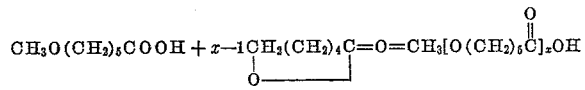

A polyfunctional initiator is believed to open the lactone ring in a similar manner but to produce an adduct having several terminal hydroxyl groups that are capable of opening further lactone rings and thereby of adding more and more lactone to the molecule. Thus, for example, the polymerization of epsilon-caprolactone initiated with a diol is believed to take place primarily as follows:

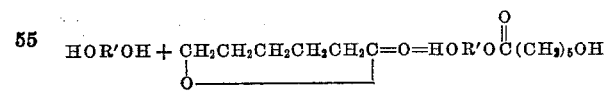

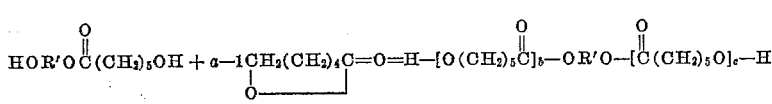

wherein $a$ is the total number of mols of lactone reacted per mol of initiator and $b+c=a$.

It will be apparent from these equations that the number of lactone residues of the final polyester will depend in large part upon the molar ratio of lactone to initiator.

A further advantage of the method of the invention is that it provides a means for making novel adducts of methanol and lactone in which the methanol and lactone are present in substantially a mol to mol ratio. These products, which may be represented by the general formula

in which n is at least four, at least n+2 R's are hydrogen, the remainder of the R's are hydrogen, alkyl, cycloalkyl, alkoxy or single ring aromatic hydrocarbon radicals, none of the substituents contain more than about twelve carbon atoms, and the total number of carbon atoms in the substituents does not exceed about twelve, have particular utility in the preparation of high molecular weight linear and branched compounds that provide inexpensive reactants for diisocyanates in the formation of polyurethane resins and also as odor masking additives.

It is preferable, in order to obtain a product of light color, to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120 to 200° C.

The proportion of lactone to initiator may vary widely depending upon the particular properties desired in the adduct or the products to be made therefrom. Where the adduct is to be a polyester having substantially the properties of a product having a succession of lactone residues, the proportion of initiator to lactone may be very small, inasmuch as theoretically one molecule of initiator is sufficient to initiate the polymerization of an infinite number of lactone molecules. On the other hand, where an essentially monomeric adduct, such as methyl-6-hydroxy-caproate is desired, or a polyfunctional initiator is used and it is desired that the polyester product be of a conjugated structure in which the random distribution of lactone residues and polyfunctional compound residues is more or less alternating, or where the polyfunctional initiator is a high molecular weight material such as a polyethylene glycol or vinyl polymer, the relative proportions may be approximately equal, or the initiator may be used in a molar excess, as demonstrated hereinafter.

The adducts obtained in accordance with the invention have molecular weights ranging from as low as 144 and 146 for the mono-adducts of epsilon-caprolactone with methylamine and methanol, respectively, to as high as 12,000 or more for the polyesters. The number of active terminal groups, primarily hydroxyl, depends upon the functionality of the initiator and the extent to which dehydration is permitted to proceed.

The adducts are suitable for reaction with isocyanates to form polyurethanes of high molecular weight and superior properties that may be faomed or unfoamed, elastomeric or rigid, as desired. The elastomeric products are outstanding particularly as to flexibility at low temperatures and ability to be stored for indefinite periods of time without premature hardening. In addition, the polyesters of the invention are eminently suitable as plasticizers in various resins, e.g., vinyl chloride-vinyl acetate resins, particularly if they are acylated in known manner to insolubilize the terminal hydroxyl groups and thus improve their resistance to extraction by water from resins with which they are combined.

As plasticizers, the polyesters of the invention have the unique advantage, hitherto so elusive in the development of plasticizers, of combining excellent low temperature performance, i.e., imparting good flexibility to resins even at temperatures below zero, with low volatility and high resistance to water and oil extraction. They are available as easily-pourable liquids, and are therefore susceptible to facile handling and mixing as compared with the highly viscous, non-pourable plasticizers heretofore available. At the same time, the plasticizers of the invention are non-toxic and light-stable.

The utility and advantages derived from the use of the catalysts in accordance with the invention will become further apparent from the following examples included to illustrate the best modes now contemplated for carrying out the invention.

EXAMPLE 1

182.2 grams epsilon-caprolactone, 5.44 grams ethylene glycol and 0.1269 grams sulfuric acid (98%), as catalyst, were maintained at a temperature of 25–27° C. for sixteen hours under an atmosphere of high purity nitrogen maintained by passing a slow stream of nitrogen through the reaction mixture at all times. The course of the reaction was followed continuously by taking refractive index readings at regular intervals and was considered to be substantially complete when a constant refractive index was reached. The polymerization product was then stripped in a goose-neck pot still up to a kettle temperature of 180–200° C. at 1–2 mm. pressure.

Inasmuch as no volatile material was removed by the stripping operation, the yield was considered to be 100%. Upon analysis, it was found that the polyester had a carboxyl number of 0.78, a hydroxyl number of 57.6, nil unsaturation and a calculated molecular weight of 1935.

EXAMPLE 2

484.5 grams epsilon-caprolactone, 15.5 grams ethylene glycol and 0.060 grams sulfuric acid (98%), as catalyst, were reacted as described in Example 1, the temprature however being 120° C. and the time of reaction eighteen hours.

It was found, upon analysis, that the yield was 100% and that the polyester had a carboxyl number of 6.38, a hydroxyl number of 52, an unsaturation equivalent weight per double bond of 29,480 and a calculated molecular weight of 1933.

EXAMPLE 3

969 grams of mixed trimethyl-epsilon-caprolactones, 31 grams ethylene glycol and 0.6984 grams sulfuric acid (98%), as catalyst, were reacted as described in Example 1, the temperature however being 120° C., the time of reaction being two hours, and the stripping being carried out at 186° C. at 1 mm. pressure.

The stripping operation yielded 34 grams of volatile material and 131 grams of residue product for a yield of 79.7%. Upon analysis, the polyester product was found to have a carboxyl number of 10.7, a hydroxyl number of 61.4, an unsaturation equivalent weight per double bond of 14,470 and a calculated molecular weight of 1510.

EXAMPLE 4

182.2 grams gamma-methyl-epsilon-caprolactone, 5.44 grams ethylene glycol and 0.1180 grams phosphoric acid (85%), as catalyst, were reacted as described in Example 1, the temperature however being 120° C. and the time of reaction 10.33 hours.

The yield was found to be 99% and the polyester product was found, upon analysis, to have a carboxyl number of 0.76, a hydroxyl number of 46.5, an unsaturation equivalent weight per double bond of 158,500, and a calculated molecular weight of 2350.

EXAMPLE 5

114 grams epsilon-caprolactone, 156 grams mixed trimethyl-epsilon-caprolactones, 8.36 grams ethylene glycol and 0.2088 grams sulfuric acid (98%), as catalyst, were reacted at a temperature of 120° C. for 2.75 hours, the epsilon-caprolactone however being added in increments of approximately 23 grams initially and at half-hour intervals thereafter until a total of 114 grams had been added. The reaction products were then stripped to 186° C. kettle temperature at 2 mm. pressure to yield 24 grams of volatile material representing a 91.4% yield of polyester.

The polyester was found, upon analysis, to have a carboxyl number of 1.03, a hydroxyl number of 52.2 and a calculated molecular weight of 2090.

EXAMPLE 6

242 grams epsilon-caprolactone, 7.75 grams ethylene glycol and 0.310 grams of boron trifluoride etherate (47% $BF_3$), as catalyst, were heated to 120° C. for three hours and the reaction products were stripped at 190° C. at 3 mm. pressure.

The yield of polyester was 100%. The hydroxyl number was 50.6, the carboxyl number was 8.28, the unsaturation was nil, and the calculated molecular weight was 1885.

EXAMPLE 7

Approximately 170 cc. (estimated to be 0.25 grams) of dry hydrogen chloride, measured with a small glass rotometer, was added to a mixture of 350 grams epsilon-caprolactone and 11.2 grams ethylene glycol. The temperature was then raised to 35° C. and the reaction continued for 5.5 hours with an indicated yield determined by measurement of the refractive index of 42%. An additional estimated 0.25 grams of dry hydrogen chloride was then added and the reaction continued for two hours more at 35° C., resulting in an indicated yield of 81%. A third increment of 0.25 grams dry hydrogen chloride was then added and the temperature was raised to 43° C. for an additional two hours. Refractive index measurements indicated substantially 100% yield at this point. Differential titrations between additions of hydrogen chloride indicated that 0.71 grams had been added when flow readings indicated 0.75 grams. The reaction mixture was then stripped at 200° C. and 1 mm. pressure.

The resulting polyester was found to have a hydroxyl number of 54.6, a carboxyl number of 4.0 and a calculated molecular weight of 1915.

The various polyesters prepared as described in Examples 1 to 7, inclusive, were heated successively with a 50% molar excess of 3,3'-dimethyl-4,4'-diphenylene diisocyanate, then with 0.6 mols monoethanolamine per mol of polyester to prepare gum stocks and finally mixed with 5, 7 and 10% more of the same diisocyanate on a roll mill and molded at 160° C. for fifteen or thirty minutes. It was found that in each instance elastomers having excellent physical properties were obtained.

EXAMPLE 8

228 grams of epsilon-caprolactone and 160 grams of methanol were refluxed for thirty-two hours at 65–67° C. in the presence of 0.11 grams of concentrated sulfuric acid (96%) as catalyst. After cooling, the catalyst was neutralized with the calculated amount of sodium methoxide. Excess methanol was removed by distillation at atmospheric pressure. The remaining product was distilled at 88° C. and 2 mm. Hg. The methyl-6-hydroxy-caproate distillate (229 grams) had a refractive index $n$ 30/D of 1.4344, a saponification equivalent of 147.2 (theory =146.1) and was obtained in 78.8% theoretical yield. The residue product (52 grams) had a hydroxyl number of 188.5 which corresponds to an adduct containing from two to three mols of epsilon-caprolactone per mol of methanol.

EXAMPLE 9

312 grams of a mixture of 3,5,5-trimethyl- and 3,3,5-trimethyl-epsilon-caprolactone and 800 cc. of methanol were refluxed for twenty hours at 65–67° C. in the presence of 0.30 cc. of concentrated sulfuric acid (96%) as catalyst. After cooling, the catalyst was removed by passing the products over an anion-exchange resin. Excess methanol was removed by distillation at atmospheric pressure. The remaining product was distilled at 63° C. and 0.025 mm. Hg. The methyl-6-hydroxytrimethylcaproate distillate (306 grams) had a refractive index $n$ 30/D of 1.4442, a saponification equivalent of 186.9 (theory =184.3) and was obtained in 81.5 theoretical yield. The residue product (41 grams) had a hydroxyl number of 184.8 and a carboxyl number of 1.7, which corresponds to an adduct containing an average of 1.7 mols of trimethyl-epsilon-caprolactone per mol of methanol.

In the foregoing examples, the carboxyl number is the number of milligrams of potassium hydroxide required to neutralize one gram of the polyester; the hydroxyl number is the number of milligrams of potassium hydroxide required to neutralize the acetic acid set free when one gram of the polyester is reacted with acetic anhydride; and the equivalent weight per double bond was found by a modified Wijs method of unsaturation analysis in which a sample of 1–2 grams of polyester was dissolved in 25 cc. of a standard 2–N Wijs solution of iodine chloride by shaking at room temperature, allowed to stand in the dark for one hour, then adding 10 cc. of a 15% aqueous solution of potassium hydroxide, titrating immediately to the disappearance of the brown iodine color with a standard 0.1–N sodium thiosulfate solution, and comparing the result with a blank titration made on 25 cc. of the Wijs solution. This unsaturation is a measure of the number of terminal hydroxyl groups removed by dehydration and resulting in the formation of a double bond. Thus, for a polyester having a molecular weight of 2000, an equivalent weight per double bond of 1000 would indicate complete dehydration, i.e., the removal of both terminal hydroxyl groups.

EXAMPLE 10

Epsilon-methyl-epsolin-caprolactone was reacted with an amount of ethylene glycol calculated to yield a polyester having a molecular weight of 2000 at 100% yield. The catalyst, catalyst concentration, polymerization time and temperature, the yield and degree of dehydration expressed in terms of equivalent weight per double bond are indicated in Table I immediately below:

*Table I*

| Catalyst Used | Percent Catalyst | Polymerization | | Percent Yield | Equivalent Weight/ Double Bond |
| --- | --- | --- | --- | --- | --- |
| | | Time, hrs. | Temp., ° C. | | |
| $H_2SO_4$ | 0.052 | 25.00 | 90 | 100.0 | 2,326 |
| $H_2SO_4$ | 0.053 | 1.75 | 120 | 98.0 | 1,218 |
| $BF_3$ | 0.075 | 4.66 | 120 | 95.6 | 1,083 |
| HCl | 1.18 | 10.50 | 120 | 100.0 | 7,970 |

The $BF_3$ used was in the form of the etherate, 47% $BF_3$.

The results indicate that with a highly active catalyst such as $H_2SO_4$ and $BF_3$ the yield is improved and the tendency to dehydration is significantly reduced by operating at lower temperature and that with a relatively weak catalyst such as HCl, even at high concentration, a 100% yield and very much less unsaturation are obtainable.

EXAMPLE 11

The reactions described in Example 10 were carried out with several different lactones and representative catalysts. The conditions and results are tabulated immediately below:

Table II

| Run No. | Epsilon-Caprolactone Used | Catalyst Used | Percent Catalyst | Polymerization Reaction | | Percent Yield |
|---|---|---|---|---|---|---|
| | | | | Temp., °C. | Time, hrs. | |
| 1 | Unsubstituted | None | | 170 | 22.0 | 88.3 |
| 2 | ----do---- | H₂SO₄ | 0.0677 | 25 | 16.0 | 100.0 |
| 3 | ----do---- | H₂SO₄ | 0.012 | 120 | 18.0 | 100.0 |
| 4 | ----do---- | H₂SO₄ | 0.054 | 180 | 0.5–1.0 | 100.0 |
| 5 | ----do---- | H₂SO₄ | 0.50 | 180 | 0.25–0.50 | 100.0 |
| 6 | ----do---- | H₃PO₄ [1] | 0.081 | 120 | 4.0 | 100.0 |
| 7 | ----do---- | BF₃ [2] | 0.0585 | 120 | 3.0 | 100.0 |
| 8 | Gamma-methyl- | H₃PO₄ [1] | 0.0535 | 120 | 10.33 | 99.0 |
| 9 | Mixed trimethyl- | H₂SO₄ | 0.0615 | 120 | 2.0 | 79.2 |
| 10 | ----do---- | H₂SO₄ | 0.50 | 120 | 1–1.5 | 80.6 |
| 11 | ----do---- | H₂SO₄ | 0.50 | 150 | 1.0 | 60.8 |
| 12 | ----do---- | H₂SO₄ | 0.50 | 180 | 0.50 | 58.0 |
| 13 | ----do---- | HCl | 2.41 | 120 | 1.0 | 84.2 |
| 14 | ----do---- | H₃PO₄ [1] | (6.0 hrs. at 0.102%). (13.0 hrs. at 0.50%). | 120 | 19.0 | 69.6 |

[1] 85% H₃PO₄ solution used.
[2] Added as etherate, 47% BF₃.

These data show the effectiveness of the catalysts in accelerating the reaction and the results obtainable over a temperature range between 25° C. and 180° C. with varying catalyst concentrations.

It is apparent that various modifications will readily occur to those skilled in the art upon reading this description. All such modifications are intended to be included within the scope of the invention as defined in the accompanying claims.

We claim:

1. In a method of preparing a polymeric lactone adduct having a molecular weight up to about 12,000 by reacting a molar excess of a lactone having from six to eight carbon atoms in the ring with an initiator of the group consisting of alcohols, organic amines and amino alcohols, the improvement which comprises carrying out the reaction in the presence of an inorganic acidic catalyst.

2. In a method of preparing a polymeric lactone adduct having a molecular weight up to about 12,000 by reacting a molar excess of a lactone having from six to eight carbon atoms in the ring with an initiator of the group consisting of alcohols, organic amines and amino alcohols, the improvement which comprises carrying out the reaction in the presence of a catalyst selected from the group consisting of sulfuric acid, phosphoric acid, hydrogen chloride and boron trifluoride.

3. Method of preparing a polymeric lactone adduct having a molecular weight up to about 12,000 which comprises reacting a molar excess of a lactone having from six to eight carbon atoms in the ring with an initiator of the group consisting of alcohols, organic amines and amino alcohols in the presence of an inorganic acidic catalyst.

4. Method of preparing a polymeric lactone adduct having a molecular weight up to about 12,000 which comprises reacting a molar excess of a lactone having from six to eight carbon atoms in the ring with an initiator of the group consisting of alcohols, organic amines and amino alcohols in the presence of a catalyst selected from the group consisting of sulfuric acid, phosphoric acid, hydrogen chloride and boron trifluoride.

5. Method of preparing a polymeric lactone adduct having a molecular weight up to about 12,000 which comprises reacting a molar excess of a caprolactone containing from zero to three alkyl substituents having a total maximum of twelve carbon atoms with a lower alkyl alcohol in the presence of an inorganic acidic catalyst.

6. Method defined in claim 5 wherein the lactone is unsubstituted epsilon-caprolactone.

7. Method defined in claim 5 wherein the lactone is gamma-methyl epsilon-caprolactone.

8. Method defined in claim 5 wherein the lactone is a mixture of trimethyl epsilon-caprolactones.

9. Method defined in claim 5 wherein the lactone is a mixture of trimethyl epsilon-caprolactones and unsubstituted epsilon-caprolactone.

10. Method defined in claim 5 wherein the alcohol is ethylene glycol.

11. Method defined in claim 5 wherein the alcohol is methanol.

12. Method defined in claim 5 wherein the catalyst is sulfuric acid.

13. Method defined in claim 5 wherein the catalyst is phosphoric acid.

14. Method defined in claim 5 wherein the catalyst is boron trifluoride etherate.

15. Method defined in claim 5 wherein the catalyst is hydrogen chloride.

References Cited in the file of this patent

UNITED STATES PATENTS

| 2,455,731 | Caldwell | Dec. 7, 1948 |
| 2,526,554 | Gresham et al. | Oct. 17, 1950 |
| 2,534,255 | Filachione et al. | Dec. 19, 1950 |

FOREIGN PATENTS

| 1,093,184 | France | Nov. 17, 1954 |

OTHER REFERENCES

Beilstein's Handbuch, 4th Ed., vol. 17, pg. 246.

Van Natta et al.: J. Am. Chem. Soc. 56 (1934), pgs. 455–7.

Spanagel et al.: J. Am. Chem. Soc. 57 (1935), pgs. 929–34.

Robinson et al.: J. Chem. Soc. (London) (1937), pgs. 371–4.

Tokura: Chem. Abstracts 43 (1949), pgs. 2175–6.

Huisgen et al.: Chem. Abstracts 47 (1953), pgs. 3812–3.